United States Patent
Carpenter et al.

(10) Patent No.: US 6,639,587 B2
(45) Date of Patent: Oct. 28, 2003

(54) METHOD AND APPARATUS FOR A SCALEABLE TOUCH PANEL CONTROLLER

(75) Inventors: Gary Dale Carpenter, Pflugerville, TX (US); Prashant Manikal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 09/978,359

(22) Filed: Oct. 16, 2001

(65) Prior Publication Data

US 2003/0071793 A1 Apr. 17, 2003

(51) Int. Cl.⁷ .................................................. G09G 5/00
(52) U.S. Cl. ........................ 345/173; 345/174; 345/179; 178/18.05
(58) Field of Search ................................ 345/156, 157, 345/168, 173, 174, 179; 178/18.01–18.11, 19.01–19.07; 341/22, 34

(56) References Cited

U.S. PATENT DOCUMENTS 5,777,596 A * 7/1998 Herbert ...................... 345/104
6,239,790 B1 * 5/2001 Martinelli et al. .......... 345/174

* cited by examiner

*Primary Examiner*—Dennis-Doon Chow
(74) *Attorney, Agent, or Firm*—Carr LLP; Robert M. Carwell

(57) ABSTRACT

A method and an apparatus for determining the contact position on a touch panel sensor. The method and apparatus utilizes a counter to determine the elapsed time that occurs before a circuit discharges from a peak value to a predetermined threshold value. The elapsed time for two or more circuits is measured, from which the contact position is determined.

30 Claims, 3 Drawing Sheets

*Fig. 3*

|   |   | MEASUREMENTS | | | | | |
|---|---|---|---|---|---|---|---|
|   |   | $R(X_1Y_1)$ | $R(X_1Y_2)$ | $R(Y_1X_1)$ | $R(Y_1X_2)$ | $R(X_1X_2)$ | $R(Y_1Y_2)$ |
| C O N N E C T E R | $X_1$ | SENSE | SENSE | GND | TRISTATE | SENSE | TRISTATE |
|  | $X_2$ | TRISTATE | TRISTATE | TRISTATE | GND | GND | TRISTATE |
|  | $Y_1$ | GND | TRISTATE | SENSE | SENSE | TRISTATE | SENSE |
|  | $Y_2$ | TRISTATE | GND | TRISTATE | TRISTATE | TRISTATE | GND |
|  | $EnC_X$ | GND | GND | TRISTATE | TRISTATE | GND | TRISTATE |
|  | $EnC_Y$ | TRISTATE | TRISTATE | GND | GND | TRISTATE | GND |

METHOD AND APPARATUS FOR A SCALEABLE TOUCH PANEL CONTROLLER

BACKGROUND OF THE INVENTION

1. Field of the Invention

The invention relates generally to computer architectures and, more particularly, to a method and an apparatus for a scaleable touch panel controller.

2. Description of Related Art

Touch panels are an increasingly popular method of entering information into a computer system. One particular technology of touch panels generally utilizes a screen comprising conductive leads arranged vertically and horizontally terminating at an X-resistance and a Y-resistance element, respectively. When the screen is touched, the conductive leads contact each other, creating an electrical path for current to flow. The position is generally determined by detecting the relative level of voltage via analog-to-digital (A/D) converters. A/D converters, however, generally require a stable power supply and linear circuit techniques, and, therefore, are not practicable for devices that utilize low-voltage linear amplifiers or scaleable-voltage amplifiers, such as some Personal Data Assistants (PDAs).

Therefore, there is a need for a method and an apparatus for providing a digital interface to a touch panel sensor.

SUMMARY

The present invention provides a method and an apparatus for determining the contact position on a touch panel sensor. The method and apparatus measures the elapsed time that passes for a circuit between two connectors to discharge from its peak value to a predetermined threshold. The contact position is determined by measuring the elapsed time for circuit to discharge between differing points.

BRIEF DESCRIPTION OF THE DRAWINGS

For a more complete understanding of the present invention, and the advantages thereof, reference is now made to the following description taken in conjunction with the accompanying drawings, in which:

FIG. 3 is a table that illustrates connections of a touch panel sensor in accordance with one embodiment of the present invention.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the operation and the implementation of electrical components, such as resistors, capacitors, and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are implemented as part of an on-chip circuit design with supporting software.

Figure 1:
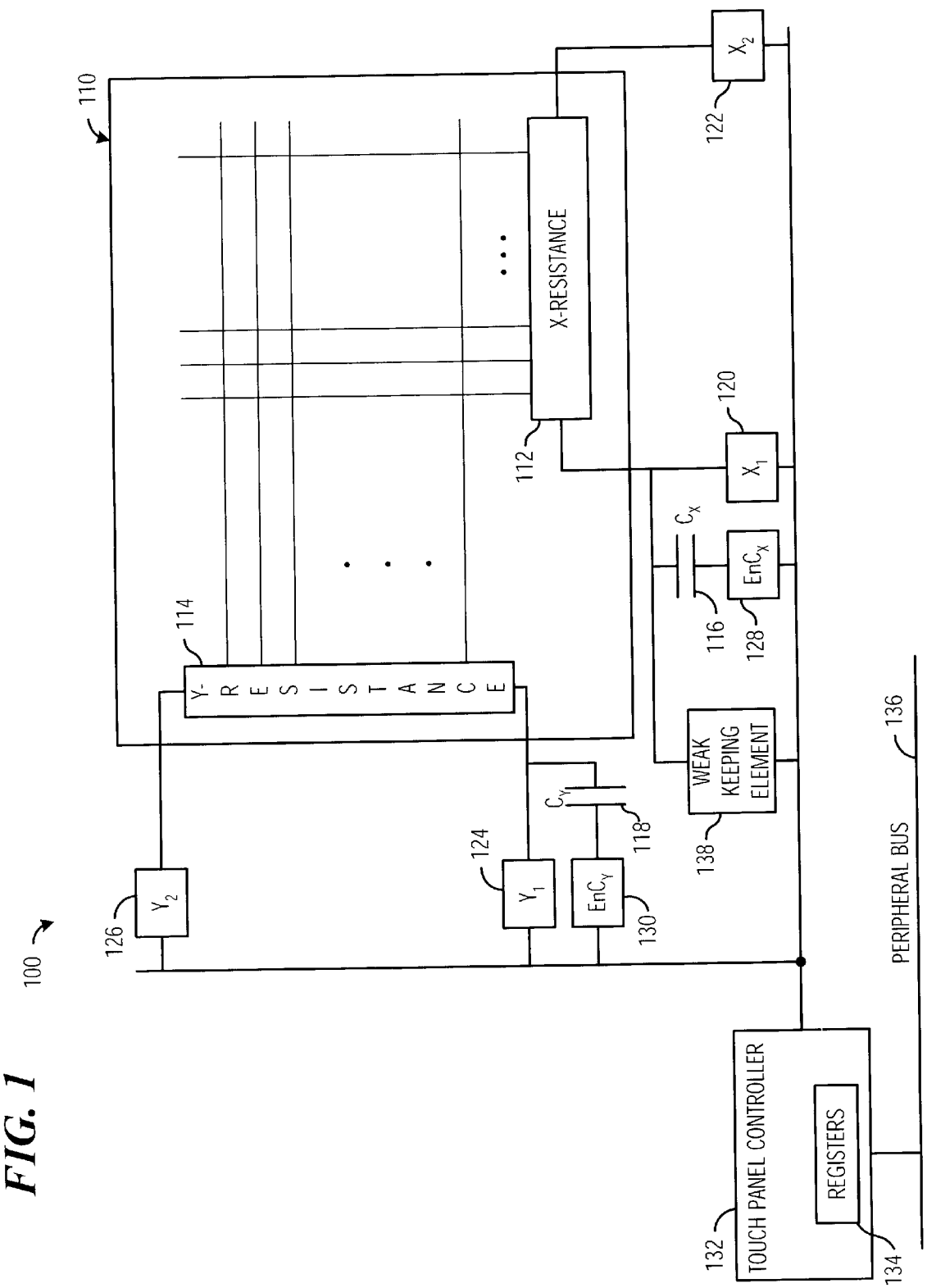
FIG. 1 is a schematic of a typical touch panel sensor that embodies the present invention.

Referring to FIG. 1 of the drawings, the reference numeral 100 generally designates a digital touch panel system embodying features of the present invention. The digital touch panel system 100 generally comprises a touch panel sensor 110 that comprises an X-resistance 112 that provides electrical resistance along the X-axis, and a Y-resistance 114 that provides electrical resistance along the Y-axis. Connectors $X_1$ 120 and $X_2$ 122, and $Y_1$ 124 and $Y_2$ 126, are electrically coupled to opposing ends of the X-resistance 112 and the Y-resistance 114, respectively.

Capacitors $C_x$ 116 and $C_y$ 118 are electrically connected to the X-resistance 112 and the Y-resistance 114, respectively, and electrically connected to an Enable $C_x$ ($EnC_x$) connector 128 and to an Enable $C_y$ ($EnC_y$) connector 130, respectively. As one skilled in the art will appreciate, and as will be described in greater detail below, X-resistance 112, the Y-resistance 114, the capacitor $C_x$ 116, and the capacitor $C_y$ 118 create a Resistor-Capacitor (RC) component in which the X-resistance 112 and the Y-resistance 114 substantially determine the rate at which the capacitors $C_x$ 116 and $C_y$ 118 discharge. The capacitors $C_x$ 116 and $C_y$ 118 are preferably selected to provide a discharge slope appropriate to obtain the required accuracy given the X-resistance 112, the Y-resistance 114, and the counter accuracy (discussed below with reference to step 212, FIG. 2).

Preferably, each connector $X_1$ 120, $X_2$ 122, $Y_1$ 124, $Y_2$ 126, $EnC_x$ 128, and $EnC_y$ 130 comprises a Bi-directional Input/Output (IO) Driver, which is considered well known to a person of ordinary skill in the art. Briefly, each Bi-directional IO Driver provides three connections to the touch panel controller 132: a tri-state enable line, an output data line, and a receiver line. The tri-state enable line enables the data line to be coupled to the touch panel sensor 110. The receiver line provides a sense point for sensing the voltage level of the connection to the touch panel sensor 110.

The touch panel controller 132 is preferably configured to control the touch panel sensor 110, and to detect the presence and location of contact on the touch panel sensor 110 by altering the electrical connections of connectors $X_1$ 120, $X_2$ 122, $Y_1$ 124, $Y_2$ 126, $EnC_x$ 128, and $EnC_y$ 130, and by measuring the transition time required for given voltage to discharge as discussed in greater detail below. The touch panel controller 132 is preferably configured to comprise of one or more internal registers 134 and electrically connected to a peripheral bus 136, which, among other things, provides an electrical connection to other electrical components (not shown), such as processors, I/O devices, and the like.

Preferably, a weak keeping element 138 is electrically connected to connector $X_1$ to provide a mechanism to detect contact, as described below with reference to FIG. 2. Briefly, the weak keeping element 138, which is preferably implemented as a pull-up resistor, allows the touch panel controller 132 to hold $X_1$ in a high state until contact is detected, at which time the $X_1$ becomes grounded without substantially affecting the reading being taken.

It should be noted that other components, such as power supplies, processors, peripheral bus controller, and the like, necessary for the operation of the present invention are not shown in order to not obscure the present invention in unnecessary detail that is considered to be obvious to one of ordinary skill in the art upon a reading of the present disclosure.

It should also be noted that the touch panel controller 132 is preferably implemented as part of an on-chip design that provides for direct connection to the touch panel sensor 110.

Figure 2:
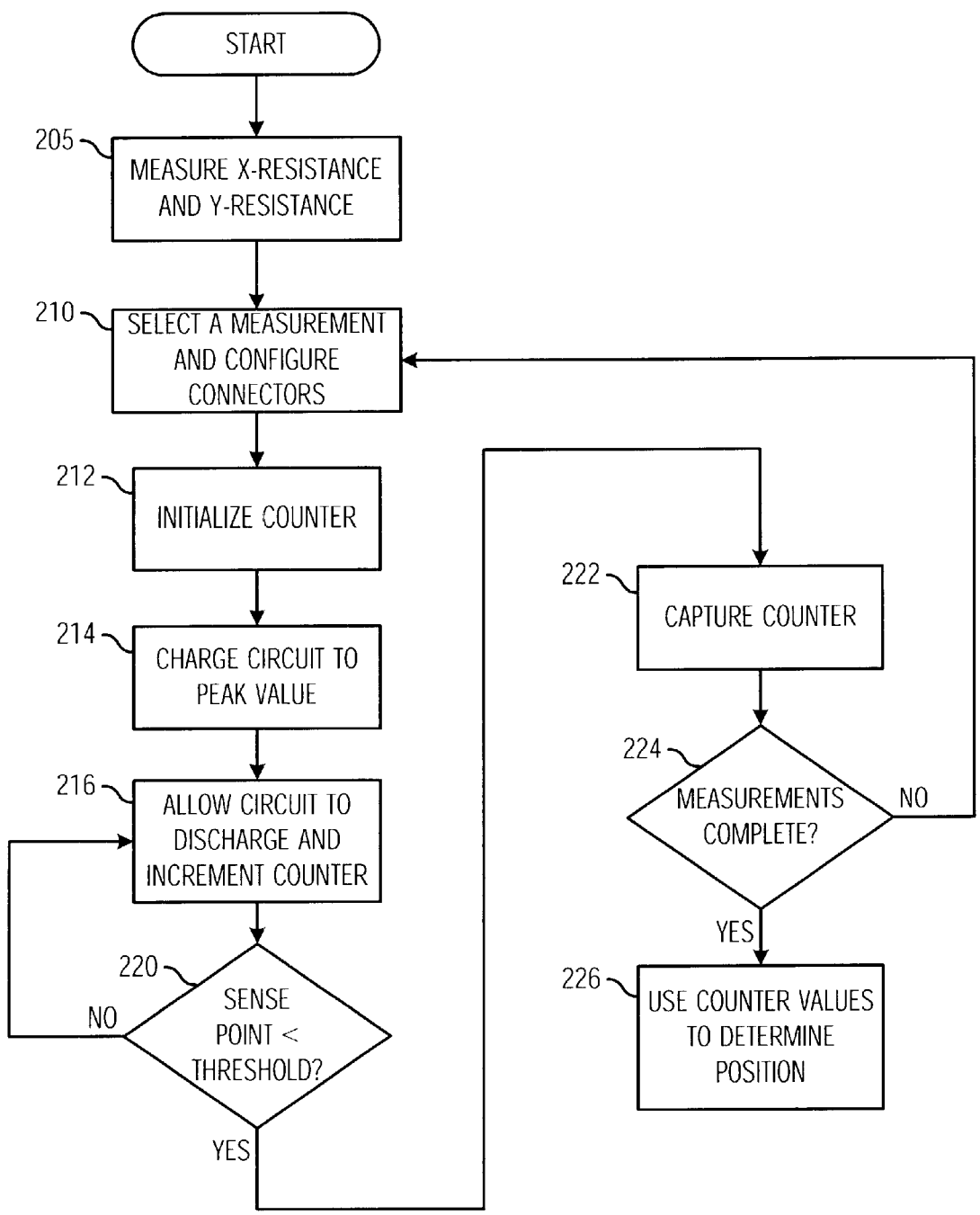
FIG. 2 is a data flow diagram illustrating one embodiment of the present invention in which a contact position on a touch panel is determined.

FIG. 2 is a flow chart depicting steps that may be performed by the digital touch panel system 100 in accordance with one embodiment of the present invention that digitally determines the position of a contact on a touch panel sensor. Processing begins in step 205, wherein the amount of resistance is measured in the X-resistance 112 and the Y-resistance 114, namely, the resistance measurements $R(X_1,X_2)$ and $R(Y_1,Y_2)$, where R(a,b) represents the resistive value between connector a and connector b, respectively, are made. Preferably, the amount of resistance is measured by coupling the connectors $X_1$ 120, $X_2$ 122, $Y_1$ 124, $Y_2$ 126, $EnC_x$ 128, and $EnC_y$ 130 and measuring the transition time for a given voltage level to discharge as described below with reference to $R(X_1,X_2)$ and $R(Y_1,Y_2)$ of FIG. 3.

Preferably, the measurement of $R(X_1,X_2)$ and $R(Y_1,Y_2)$ is performed when contact is not detected on the touch panel sensor 110. Contact is detected in the preferred embodiment by setting $X_2$ 122 and $Y_2$ 126 in tri-state, connecting $Y_1$ 124 to ground and setting $X_1$ 120 high via the weak keeping element 138. Contact is then determined when $X_1$ 120 returns low as a result of the charge of $X_1$ 120 being connected to ground at connector $Y_1$ 124.

In step 210, a measurement is selected and the connectors $X_1$ 120, $X_2$ 122, $Y_1$ 124, $Y_2$ 126, $EnC_x$ 128, and $EnC_y$ 130 are configured accordingly. As will be discussed in greater detail below with reference to FIG. 3, a total of four measurements are taken when contact is detected. Specifically, the preferred calculation of the location of a contact on the touch panel 110 requires the resistive values of $R(X_1,Y_1)$, $R(X_1,Y_2)$, $R(Y_1,X_1)$, and $R(Y_1,X_2)$ when contact is detected.

After selecting a measurement and configuring the connectors accordingly in step 210, processing proceeds to step 212, wherein a counter is initialized to zero. In step 214, the circuit comprising the X-resistance 112, the Y-resistance 114, the $C_x$ capacitor 116, and the $C_y$ capacitor 118, is charged to its peak value, preferably the supply voltage for the bi-directional IO driver. In step 216 the circuit is allowed discharge via the appropriate GND connection via the touch panel sensor 110 while the counter is incremented.

In step 220, a determination is made whether the voltage at the appropriate sense connector (as indicated in FIG. 3) is less than a predefined threshold. Preferably, the predefined threshold is set as a fraction, such as one-half, of the maximum supply voltage of the receiver of the tri-state, bi-directional driver/receiver buffers, commonly referred to as ($V_{DD}/2$). If, in step 220, a determination is made that the voltage at the sense connector is not less than the predefined threshold, then processing returns to step 216, wherein the circuit is allowed to discharge further and the counter incremented.

The method and apparatus for charging/discharging the circuit and using the counter discussed above is considered to be within the skills of a person of ordinary skill in the art upon a reading of the present disclosure. In the preferred embodiment, however, a counter is implemented in hardware that is enabled upon the circuit reaching its peak value. The counter is allowed to increment while the circuit is discharging. Upon the circuit discharging to a predefined threshold, the value of the counter is stored in the registers 134, and an interrupt signal is generated. Application software receives the interrupt and evaluates the contents of the registers 134 to determine the contact position as discussed below with reference to step 226.

If, in step 220, a determination is made that the voltage at the sense connector is less than the predefined threshold, then processing proceeds to step 222, wherein the value of the counter is captured and stored, preferably in the registers 134 (FIG. 1).

In step 224, a determination is made whether all resistive measurements have been made. As discussed above, preferably four measurements are made for use in calculating the contact position on the touch panel sensor 110. If, in step 224, a determination is made that all four measurements have not been made, then processing returns to step 210, wherein a measurement is selected and processed as described above with reference to steps 210–220.

If, however, in step 224, a determination that all four measurements have been made, then processing proceeds to step 226, wherein the measurements, i.e., the counter values, are used to determine the contact position upon the touch panel sensor 110. Preferably, the contact position is determined according to the following equation:

$$R(X_a)=[R(Y_1,X_1)-R(Y_1,X_2)+R(X_1,X_2)]/2$$

$$R(Y_a)=[R(X_1,Y_1)-R(X_1,Y_2)+R(Y_1,Y_2)]/2$$

where:
$R(X_a)$ represents the position of the contact along the X-axis relative to $X_1$ 120; and
$R(Y_a)$ represents the position of the contact along the Y-axis relative to $Y_1$ 124.

Therefore, the coordinate of the contact is given by ($R(X_a)$, $R(Y_a)$) relative to the origin ($X_1,Y_1$). It should be noted that the contact position is a relative position and is unitless, i.e., a percentage of the touch panel sensor 110 from the origin.

FIG. 3 is a table illustrating the connections and the measurements used in making the six measurements discussed above with reference to FIG. 2 in accordance with the preferred embodiment of the present invention. Specifically, FIG. 3 depicts how each of the connectors $X_1$ 120, $X_2$ 122, $Y_1$ 124, $Y_2$ 126, $EnC_x$ 128, and $EnC_y$ 130 are connected to measure each of $R(X_1,Y_1)$, $R(X_1,Y_2)$, $R(Y_1,X_1)$, $R(Y_1,X_2)$, $R(X_1,X_2)$, and $R(Y_1,Y_2)$. As noted above, it is preferred that $R(X_1,X_2)$ and $R(Y_1,Y_2)$ are measured when no contact is detected, and $R(X_1,Y_1)$, $R(X_1,Y_2)$, $R(Y_1,X_1)$, and $R(Y_1,X_2)$ are measured when contact is detected.

For example, to make the measurement of the resistance from connector $X_1$ 120 to connector $Y_1$ 124, specified as $R(X_1,Y_1)$, it is preferred that $X_1$ 120 is connected as a sense point, $X_2$ 122 is in tri-state (not connected or dangling), $Y_1$ 124 is connected to ground, $Y_2$ 126 is in tri-state, $EnC_x$ 128 is connected to ground, and $EnC_y$ 130 is in tri-state. Upon making the connections specified, the circuit is charged and the voltage of $X_1$ 120 is connected as a sense point to measure the voltage as discussed above with reference to steps 214–220 (FIG. 2).

As will be appreciated by one skilled in the art, the contact position may be determined by connecting the touch panel sensor 110 differently and obtaining different measurements. The connections and measurements presented herein is the preferred embodiment and are provided for illustrative purposes only, and, therefore, should not be interpreted as limiting the present invention to the specific connections and/or measurements specified herein in any manner.

It is understood that the present invention can take many forms and embodiments. Accordingly, several variations may be made in the foregoing without departing from the spirit or the scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An apparatus for determining a relative contact position on a touch panel sensor comprising an X-resistance and a Y-resistance, the X-resistance having a first X-connection and a second X-connection, and the Y-resistance having a first Y-connection and a second Y-connection, the apparatus comprising:

means for connecting the first X-connection to an X capacitor;

means for connecting the first Y-connection to a Y capacitor;

means for connecting the first X-connection, the second X-connection, the first Y-connection, the second Y-connection, the X capacitor, and the Y capacitor so that each of two or more circuits are enabled to measure the relative resistance between each of the first X-connection, the second X-connection, the first Y-connection, and the second Y-connection, each of the two or more circuits having a sense point;

means for configuring each of the two or more circuits to be charged to peak capacity;

means for configuring each of the two or more circuits to discharge below a predetermined threshold as measured at the sense point;

means for connecting each of the two or more circuits to measure an elapsed time for to each circuit to discharge below the predetermined threshold; and means for determining from the elapsed time that each of the two or more circuits the relative contact position.

2. The apparatus of claim 1, wherein the means for connecting the first X-connection, the second X-connection, the first Y-connection, the second Y-connection, the X capacitor, and the Y capacitor comprise bi-directional IO drivers.

3. The apparatus of claim 1, wherein the means for connecting the first X-connection, the second X-connection, the first Y-connection, the second Y-connection, the X capacitor, and the Y capacitor are bi-directional IO drivers having a receiver portion, and wherein the predetermined threshold is substantially equivalent to one-half the maximum supply voltage of the receiver portion.

4. The apparatus of claim 1, wherein the means for measuring an elapsed time comprises a counter.

5. The apparatus of claim 1, wherein the means for determining the contact position comprises means for determining the contact position with reference to the relative resistance from the first X-connection to the first Y-connection, the relative resistance from the first X-connection to the second Y-connection, the relative resistance from the first Y-connection to the first X-connection, the relative resistance from the first Y-connection to the second X-connection, the relative resistance from the first X-connection to the second X-connection, and the relative resistance from the first Y-connection to the second Y-connection.

6. The apparatus of claim 1, wherein the means for determining the contact position comprises means for performing the equations:

$$R(X_a)=[R(Y_1,X_1)-R(Y_1,X_2)+R(X_1,X_2)]/2$$
$$R(Y_a)=[R(X_1,Y_1)-R(X_1,Y_2)+R(Y_1,Y_2)]/2$$

where:
$R(Y_1,X_1)$ represents the relative resistance from the first Y-connection to the first X-connection;
$R(Y_1,X_2)$ represents the relative resistance from the first Y-connection to the second X-connection;
$R(X_1,X_2)$ represents the relative resistance from the first X-connection to the second X-connection;
$R(X_1,Y_1)$ represents the relative resistance from the first X-connection to the first Y-connection;
$R(X_1,Y_2)$ represents the relative resistance from the first X-connection to the second Y-connection;
$R(Y_1,Y_2)$ represents the relative resistance from the first Y-connection to the second Y-connection;
$R(X_a)$ represents the position of the contact along the X-axis relative to the first X-connection; and
$R(Y_a)$ represents the position of the contact along the Y-axis relative to the first Y-connection.

7. The apparatus of claim 1, wherein the two or more circuits measures at least one of the resistance between the first X connection and the first Y connection, the resistance between the first X connection and the second Y connection, the resistance between the first Y connection and the first X connection, the resistance between the first Y connection and the second X connection, the resistance between the first X connection and the second X connection, and the resistance between the first Y connection and the second Y connection.

8. An apparatus for determining a contact position on a touch panel sensor comprising a first X-connection and a second X-connection at opposing ends of an X-resistance, and a first Y-connection and a second Y-connection at opposing ends of a Y-resistance, the method comprising the steps of:

means for measuring a first value as the relative resistance between the first X-connection and the first Y-connection;

means for measuring a second value as the relative resistance between the first X-connection and the second Y-connection;

means for measuring a third value as the relative resistance between the first Y-connection and the first X-connection;

means for measuring a fourth value as the relative resistance between the first Y-connection and the second X-connection;

means for measuring a fifth value as the relative resistance between the first X-connection and the second X-connection;

means for measuring a sixth value as the relative resistance between the first Y-connection and the second Y-connection; and means for determining the contact position with reference to the first value, the second value, the third value, the fourth value, the fifth value, and the sixth value.

9. The apparatus of claim 8, wherein the means for measuring comprise means for measuring the elapsed time that a peak charge discharges.

10. The apparatus of claim 8, wherein the means for determining the contact position comprise means for performing the equation:

$$R(X_a)=[R(Y_1,X_1)-R(Y_1,X_2)+R(X_1,X_2)]/2$$

$$R(Y_a)=[R(X_1,Y_1)-R(X_1,Y_2)+R(Y_1,Y_2)]/2$$

where:
$R(Y_1,X_1)$ represents the relative resistance from the first Y-connection to the first X-connection;
$R(Y_1,X_2)$ represents the relative resistance from the first Y-connection to the second X-connection;
$R(X_1,X_2)$ represents the relative resistance from the first X-connection to the second X-connection;
$R(X_1,Y_1)$ represents the relative resistance from the first X-connection to the first Y-connection;
$R(X_1,Y_2)$ represents the relative resistance from the first X-connection to the second Y-connection;
$R(Y_1,Y_2)$ represents the relative resistance from the first Y-connection to the second Y-connection;
$R(X_a)$ represents the position of the contact along the X-axis relative to the first X-connection; and
$R(Y_a)$ represents the position of the contact along the Y-axis relative to the first Y-connection.

11. The apparatus of claim 8, wherein the means for measuring comprise bi-directional IO drivers and capacitors.

12. A method of determining a relative contact position on a touch panel sensor comprising an X-resistance and a Y-resistance, the X-resistance having a first X-connection and a second X-connection, and the Y-resistance having a first Y-connection and a second Y-connection, the method comprising the steps of:
connecting the first X-connection to an X capacitor;
connecting the first Y-connection to a Y capacitor;
connecting the first X-connection, the second X-connection, the first Y-connection, the second Y-connection, the X capacitor, and the Y capacitor so that each of two or more circuits are enabled to measure the relative resistance between each of the first X-connection, the second X-connection, the first Y-connection, and the second Y-connection, each of the two or more circuits having a sense point;
configuring each of the two or more circuits to be charged to peak capacity;
configuring each of the two or more circuits to discharge below a predetermined threshold as measured at the sense point;
connecting each of the two or more circuits to measure an elapsed time for to each circuit to discharge below the predetermined threshold; and
determining from the elapsed time that each of the two or more circuits the relative contact position.

13. The method of claim 12, wherein the step of connecting the first X-connection, the second X-connection, the first Y-connection, the second Y-connection, the X capacitor, and the Y capacitor comprises bi-directional IO drivers.

14. The method of claim 12, wherein the step of connecting the first X-connection, the second X-connection, the first Y-connection, the second Y-connection, the X capacitor, and the Y capacitor is performed via bi-directional IO drivers having a receiver portion, and wherein the predetermined threshold is substantially equivalent to one-half the maximum supply voltage of the receiver portion.

15. The method of claim 12, wherein the step of measuring an elapsed time comprises a counter.

16. The method of claim 12, wherein the step of determining the contact position is performed with reference to the relative resistance from the first X-connection to the first Y-connection, the relative resistance from the first X-connection to the second Y-connection, the relative resistance from the first Y-connection to the first X-connection, the relative resistance from the first Y-connection to the second X-connection, the relative resistance from the first X-connection to the second X-connection, and the relative resistance from the first Y-connection to the second Y-connection.

17. The method of claim 12, wherein the step of determining the contact position is performed according to the equations:

$$R(X_a)=[R(Y_1,X_1)-R(Y_1,X_2)+R(X_1,X_2)]/2$$

$$R(Y_a)=[R(X_1,Y_1)-R(X_1,Y_2)+R(Y_1,Y_2)]/2$$

where:
$R(Y_1,X_1)$ represents the relative resistance from the first Y-connection to the first X-connection;
$R(Y_1,X_2)$ represents the relative resistance from the first Y-connection to the second X-connection;
$R(X_1,X_2)$ represents the relative resistance from the first X-connection to the second X-connection;
$R(X_1,Y_1)$ represents the relative resistance from the first X-connection to the first Y-connection;
$R(X_1,Y_2)$ represents the relative resistance from the first X-connection to the second Y-connection;
$R(Y_1,Y_2)$ represents the relative resistance from the first Y-connection to the second Y-connection;
$R(X_a)$ represents the position of the contact along the X-axis relative to the first X-connection; and
$R(Y_a)$ represents the position of the contact along the Y-axis relative to the first Y-connection.

18. The method of claim 12, wherein the two or more circuits measures at least one of the resistance between the first X connection and the first Y connection, the resistance between the first X connection and the second Y connection, the resistance between the first Y connection and the first X connection, the resistance between the first Y connection and the second X connection, the resistance between the first X connection and the second X connection, and the resistance between the first Y connection and the second Y connection.

19. A method of determining a contact position on a touch panel sensor comprising a first X-connection and a second X-connection at opposing ends of an X-resistance, and a first Y-connection and a second Y-connection at opposing ends of a Y-resistance, the method comprising the steps of:
measuring a first value as the relative resistance between the first X-connection and the first Y-connection;
measuring a second value as the relative resistance between the first X-connection and the second Y-connection;
measuring a third value as the relative resistance between the first Y-connection and the first X-connection;
measuring a fourth value as the relative resistance between the first Y-connection and the second X-connection;
measuring a fifth value as the relative resistance between the first X-connection and the second X-connection;
measuring a sixth value as the relative resistance between the first Y-connection and the second Y-connection; and
determining the contact position with reference to the first value, the second value, the third value, the fourth value, the fifth value, and the sixth value.

20. The method of claim 19, wherein the steps of measuring comprises measuring the elapsed time that a peak charge discharges.

21. The method of claim 19, wherein the step of determining the contact position is performed according to the equation:

$$R(X_a)=[R(Y_1,X_1)-R(Y_1,X_2)+R(X_1,X_2)]/2$$

$$R(Y_a)=[R(X_1,Y_1)-R(X_1,Y_2)+R(Y_1,Y_2)]/2$$

where:
- $R(Y_1,X_1)$ represents the relative resistance from the first Y-connection to the first X-connection;
- $R(Y_1,X_2)$ represents the relative resistance from the first Y-connection to the second X-connection;
- $R(X_1,X_2)$ represents the relative resistance from the first X-connection to the second X-connection;
- $R(X_1,Y_1)$ represents the relative resistance from the first X-connection to the first Y-connection;
- $R(X_1,Y_2)$ represents the relative resistance from the first X-connection to the second Y-connection;
- $R(Y_1,Y_2)$ represents the relative resistance from the first Y-connection to the second Y-connection;
- $R(X_a)$ represents the position of the contact along the X-axis relative to the first X-connection; and
- $R(Y_a)$ represents the position of the contact along the Y-axis relative to the first Y-connection.

22. The method of claim 19, wherein the steps of measuring are performed via bi-directional IO drivers and capacitors.

23. A computer program product for determining a relative contact position on a touch panel sensor comprising an X-resistance and a Y-resistance, the X-resistance having a first X-connection and a second X-connection, and the Y-resistance having a first Y-connection and a second Y-connection, the computer program product having a medium with a computer program embodied thereon, the computer program comprising:
- computer program code for connecting the first X-connection to an X capacitor;
- computer program code for connecting the first Y-connection to a Y capacitor;
- computer program code for connecting the first X-connection, the second X-connection, the first Y-connection, the second Y-connection, the X capacitor, and the Y capacitor so that each of two or more circuits are enabled to measure the relative resistance between each of the first X-connection, the second X-connection, the first Y-connection, and the second Y-connection, each of the two or more circuits having a sense point;
- computer program code for configuring each of the two or more circuits to be charged to peak capacity;
- computer program code for configuring each of the two or more circuits to discharge below a predetermined threshold as measured at the sense point;
- computer program code for connecting each of the two or more circuits to measure an elapsed time for to each circuit to discharge below the predetermined threshold; and
- computer program code for determining from the elapsed time that each of the two or more circuits the relative contact position.

24. The computer program product of claim 23, wherein the computer program code for measuring an elapsed time comprises a counter.

25. The computer program product of claim 23, wherein the computer program code for determining the contact position is performed with reference to the relative resistance from the first X-connection to the first Y-connection, the relative resistance from the first X-connection to the second Y-connection, the relative resistance from the first Y-connection to the first X-connection, the relative resistance from the first Y-connection to the second X-connection, the relative resistance from the first X-connection to the second X-connection, and the relative resistance from the first Y-connection to the second Y-connection.

26. The computer program product of claim 23, wherein the computer program code for determining the contact position is performed according to the equations:

$$R(X_a)=[R(Y_1,X_1)-R(Y_1,X_2)+R(X_1,X_2)]/2$$

$$R(Y_a)=[R(X_1,Y_1)-R(X_1,Y_2)+R(Y_1,Y_2)]/2$$

where:
- $R(Y_1,X_1)$ represents the relative resistance from the first Y-connection to the first X-connection;
- $R(Y_1,X_2)$ represents the relative resistance from the first Y-connection to the second X-connection;
- $R(X_1,X_2)$ represents the relative resistance from the first X-connection to the second X-connection;
- $R(X_1,Y_1)$ represents the relative resistance from the first X-connection to the first Y-connection;
- $R(X_1,Y_2)$ represents the relative resistance from the first X-connection to the second Y-connection;
- $R(Y_1,Y_2)$ represents the relative resistance from the first Y-connection to the second Y-connection;
- $R(X_a)$ represents the position of the contact along the X-axis relative to the first X-connection; and
- $R(Y_a)$ represents the position of the contact along the Y-axis relative to the first Y-connection.

27. The computer program product of claim 23, wherein the two or more circuits measures at least one of the resistance between the first X connection and the first Y connection, the resistance between the first X connection and the second Y connection, the resistance between the first Y connection and the first X connection, the resistance between the first Y connection and the second X connection, the resistance between the first X connection and the second X connection, and the resistance between the first Y connection and the second Y connection.

28. A computer program product for determining a contact position on a touch panel sensor comprising a first X-connection and a second X-connection at opposing ends of an X-resistance, and a first Y-connection and a second Y-connection at opposing ends of a Y-resistance, the computer program product having a medium with a computer program embodied thereon, the computer program comprising:
- computer program code for measuring a first value as the relative resistance between the first X-connection and the first Y-connection;
- computer program code for measuring a second value as the relative resistance between the first X-connection and the second Y-connection;
- computer program code for measuring a third value as the relative resistance between the first Y-connection and the first X-connection;
- computer program code for measuring a fourth value as the relative resistance between the first Y-connection and the second X-connection;
- measuring a fifth value as the relative resistance between the first X-connection and the second X-connection;

computer program code for measuring a sixth value as the relative resistance between the first Y-connection and the second Y-connection; and computer program code for determining the contact position with reference to the first value, the second value, the third value, the fourth value, the fifth value, and the sixth value.

29. The computer program product of claim 28, wherein the computer program code for measuring comprises computer program code for measuring the elapsed time that a peak charge discharges.

30. The computer program product of claim 28, wherein the computer program code for determining the contact position is performed according to the equation:

$$R(X_a) = [R(Y_1,X_1) - R(Y_1,X_2) + R(X_1,X_2)]/2$$

$$R(Y_a) = [R(X_1,Y_1) - R(X_1,Y_2) + R(Y_1,Y_2)]/2$$

where:
$R(Y_1,X_1)$ represents the relative resistance from the first Y-connection to the first X-connection;
$R(Y_1,X_2)$ represents the relative resistance from the first Y-connection to the second X-connection;
$R(X_1,X_2)$ represents the relative resistance from the first X-connection to the second X-connection;
$R(X_1,Y_1)$ represents the relative resistance from the first X-connection to the first Y-connection;
$R(X_1,Y_2)$ represents the relative resistance from the first X-connection to the second Y-connection;
$R(Y_1,Y_2)$ represents the relative resistance from the first Y-connection to the second Y-connection;
$R(X_a)$ represents the position of the contact along the X-axis relative to the first X-connection; and
$R(Y_a)$ represents the position of the contact along the Y-axis relative to the first Y-connection.

\* \* \* \* \*